United States Patent [19]

Croseck et al.

[11] Patent Number: 4,460,326

[45] Date of Patent: Jul. 17, 1984

[54] PRESS FOR MOLDINGS

[75] Inventors: Hans-Henning Croseck, Konz; Rolf Jung, Trier, both of Fed. Rep. of Germany

[73] Assignee: Laeis-Werke AG., Trier, Fed. Rep. of Germany

[21] Appl. No.: 392,767

[22] Filed: Jun. 28, 1982

Related U.S. Application Data

[63] Continuation-in-part of Ser. No. 177,782, Aug. 13, 1980, abandoned.

[30] Foreign Application Priority Data

Aug. 30, 1979 [DE] Fed. Rep. of Germany ....... 2935077

[51] Int. Cl.³ .................................................. B29C 3/00

[52] U.S. Cl. ........................................ 425/411; 425/3; 425/78; 425/590

[58] Field of Search ............... 425/406, 411, 412, 415, 425/422, 423, 78, DIG. 33, 3, 450.1, 451.2, 451.9, 436, 444, 577, 590, DIG. 223

[56] References Cited

U.S. PATENT DOCUMENTS

| | | | |
|---|---|---|---|
| 2,738,550 | 3/1956 | Groves | 425/352 |
| 3,070,003 | 12/1962 | Stacy | 425/415 |
| 3,091,810 | 6/1963 | Turner | 425/450.1 |
| 3,567,174 | 3/1971 | Grace | 425/3 |
| 3,587,144 | 6/1971 | Mechling | 425/422 |
| 3,667,880 | 6/1972 | Malet | 425/3 |
| 3,898,030 | 8/1975 | Bishop | 425/450.1 |
| 3,905,741 | 9/1975 | Poncet | 425/450.1 |
| 3,910,748 | 10/1975 | Kopernik | 425/3 |
| 3,923,440 | 12/1975 | Bettonica | 425/577 |
| 3,975,133 | 8/1976 | Nussbaumer | 425/451.2 |
| 4,005,974 | 2/1977 | Szabo | 425/DIG. 223 |
| 4,157,887 | 6/1979 | Sothje | 425/423 |
| 4,158,910 | 6/1979 | Hanas et al. | 425/590 |
| 4,345,893 | 8/1982 | Prince | 425/451.2 |

*Primary Examiner*—Donald E. Czaja
*Assistant Examiner*—Mary A. Becker

[57] ABSTRACT

Am improved press for molding ceramic material which has a base frame on which a first carrier is rigidly mounted and which fixedly supports a stationary punch. A stripper platen is slidably movably supported on said first carrier and is adapted to be reciprocated therein by third piston and cylinder means mounted in said first carrier. The stripper platen includes an annular chamber disposed around the stationary punch for receiving granular ceramic material from a hopper mounted in the base frame. A second carrier is also rigidly mounted in the base frame and supports first and second cylinder and piston means. The first cylinder and piston means serves to support a movable punch which exerts the main molding pressure on the ceramic material when the stationary and movable punch are in the molding position. The second cylinder and piston serve to move the movable punch towards and away from the stationary punch and to exert supplemental pressure on the movable punch during the molding process.

6 Claims, 2 Drawing Figures

PRESS FOR MOLDINGS

This is a continuation-in-part application of our copending application, Ser. No. 177,782, filed on Aug. 13, 1980 entitled PRESS FOR MOLDINGS, now abandoned.

CROSS-REFERENCE TO RELATED APPLICATIONS

This application is related to our copending application entitled IMPROVED MULTIPLE PRESS FOR CERAMIC MOLDINGS, Ser. No. 177,830, filed Aug. 13, 1980, now U.S. Pat. No. 4,341,510.

BACKGROUND OF THE INVENTION

The invention relates to a press for moldings, particularly for ceramic moldings, in which, on the one hand, a carrier for a fixed plunger and for a horizontally displaceable female mold and, on the other hand, a carrier for a movable plunger are rigidly connected to a press stand.

The known presses of this type are being designed for ever-increasing output performance, particularly for a more rapid operation and a greater simultaneous yield. This goal can be obtained in many cases by the use of a number of molds arranged side by side, so that a number of moldings are produced in each pressing operation.

The known types of presses, suitable for this high rate of performance, are very costly to construct. Such a known press is, for example, described in U.S. Pat. No. 3,923,400. This known press has a multiplicity of operating elements which cause frequent malfunctioning, particularly as regards the operation of feeding the mold cavities with the molding batch in the correct quantity and at the correct point in time of the operating cycle.

For example, the press described in U.S. Pat. No. 3,923,440 requires a plurality of double acting pistons and in general a large number of piston-cylinder arrangements.

SUMMARY OF THE INVENTION

It is a general object of this invention to provide a press of the afore-described type which can feed correctly at high speed and can perform the pressing process in a faultless manner while at the same time being of simplified construction.

The solution proposed by the invention resides in the fact that a mounting plate bearing the movable plunger is acted on by a piston biased against the rear side of the said plate which exerts pressure in the pressing process. In addition thereto two pressure cylinders with pistons act, via piston rods rigidly connected to the rear side of the mounting plate, to effect the forward and return movement of the said mounting plate. The pressure cylinders are provided with means for positioning the plunger. This ensures that actuating elements only act on the mounting plate from one side, so that the actual pressure space between the mounting plates remains free of actuating elements. Furthermore, additional components for positioning elements, such as pistons or hydraulic springs, can be dispensed with. Apart from the pressure piston all the moving elements used on the movable mounting plate are of the same kind and exert the same effect.

A further improvement of the press to which this invention relates resides in that the first piston in the pressure cylinder is preceded by a second piston with which piston rods are connected, there being provided an adjusting rod for each second piston and piston rod, which passes through the rear end wall of the pressure cylinder and which is connected with the respective first piston. Each adjusting rod has an adjustable and lockable stop which, when coming to rest against the end wall, limits the advance of the mounting plate. The first piston thus enables the movable plunger to be advanced and positioned, while the second piston provides the means for the further advance of the mounting plate and thus of the movable plunger in the pressing process and also for the return movement of the mounting plate.

In a further version of the invention it is possible, in the pressing process, for additional pressure to be exerted on the mounting plate with the second piston in the pressure cylinder and via the piston rods connected to the said mounting plate in the outer zone of the latter. This, on the one hand, makes it possible to design the main piston, with its corresponding cylinder, for exerting the main pressure in the pressing process, for a performance up to 25% lower, e.g. for only 500 t, for instance, while a further 150 t of pressure is exerted on the mounting plate by the second piston. The mounting plate itself, particularly when it is required to accommodate a number of plungers, can likewise be made correspondingly less massive, because the piston rods acting on it from the outside prevent it from sagging in the course of the pressing process. The invention provides that in place of the two piston rods with piston and pressure cylinder a larger number of these, such as (for example) four, can be provided, one in each corner of the mounting plate, according to the size of the latter.

The invention also provides that the frame can contain a filling chamber taking the form of an annular space around the plunger or plungers. This ensures that in the filling process the molding batch will flow or drop into the mold rapidly, even when moving laterally. According to the invention it is then desirable for the lower portion of the annular space of the filling chamber to be of closed construction, so that no molding batch material will accumulate therein and cause failures or breakdowns.

According to a further feature of the invention the press is provided with a filling hopper which is fixed to the press stand and underneath which the stripper platen is slidably guided via a stripping frame. This ensures that when the press is closed after being filled with a supply of molding batch, the molding batch supply is automatically shut off as the stripper platen advances, obstructions on the feed conduit thus being obviated. The unimpeded advance and return movement of the stripper platen is effected, according to the invention, by means of a double-acting piston mounted in the holder of the fixed plunger. In accordance with the process of the invention the advance movement of the stripper platen can be limited by means of stops provided on guide bars connected with the stripper platen, on the one hand, and with the piston on the other. Both stops on these guide bars can be mounted in the interior of the press stand, between the carrier frame for the fixed plunger and the rear wall of the stand, or else one of the stops can be positioned on the outside in front of the said rear wall. The quantity of molding batch fed into the filling space is thereby accurately adjusted.

The invention makes it possible to design the mounting plates for the plungers smaller and simpler by equipping them with holding plates based on a permanent electromagnet. This simplifies the tool changing operations, in particular, in view of the fact that no screws need to be released. Thanks to the action of the permanent magnet the movable plunger or plungers are attached to the smooth surface of the holding or mounting plates and do not fall off even in the event of a failure in the current supply. During the pressing process the holding force is intensified by electromagnetism, while for release purposes the direction of the current is reversed, so that no magnetic force is any longer in effect.

BRIEF DESCRIPTION OF THE DRAWING

The press to which the invention relates will be explained below by reference to the description of an example and to the appended drawing in which.

DESCRIPTION OF THE PREFERRED EMBODIMENT

Figures 1, 2:
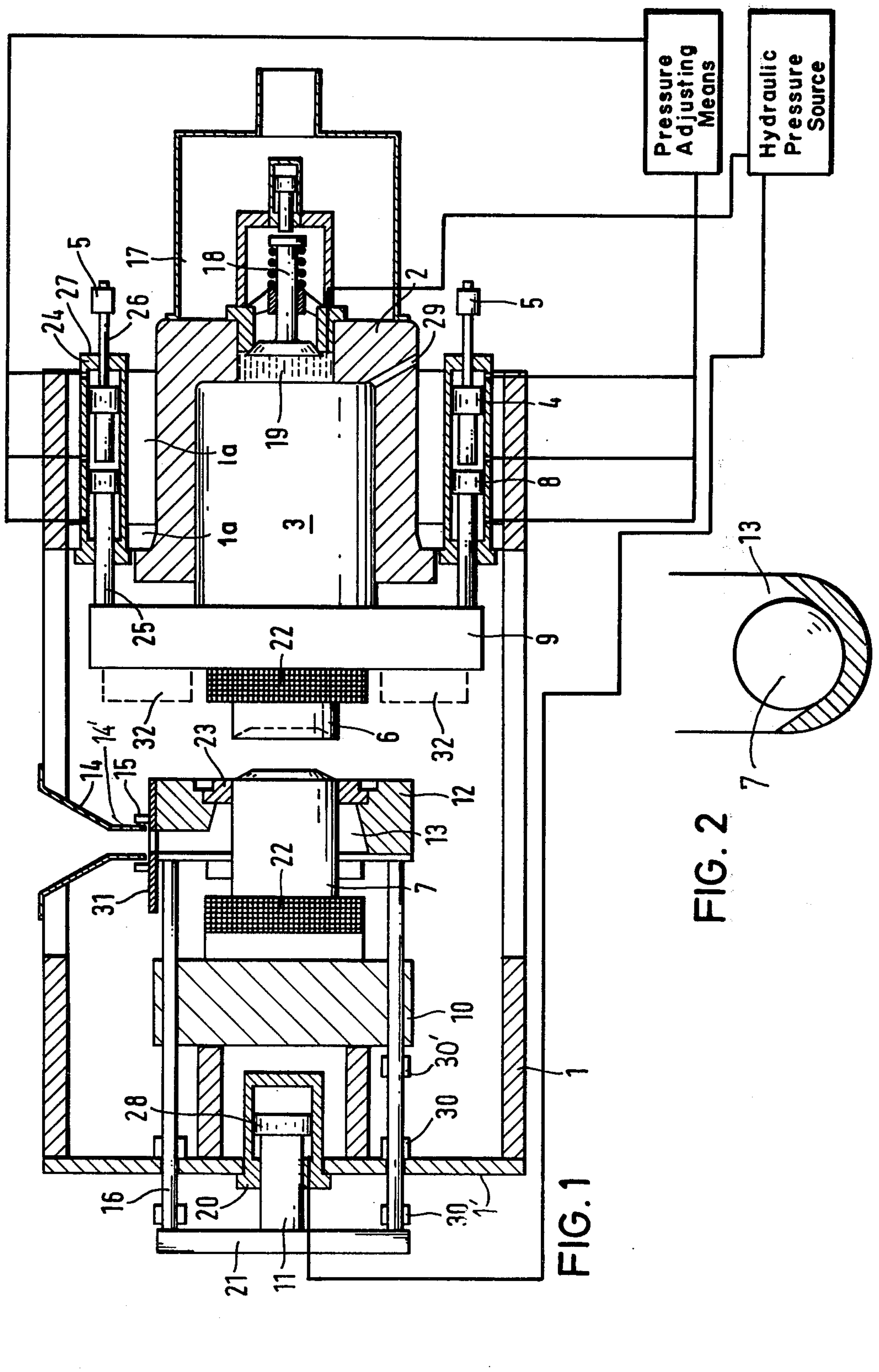
FIG. 1 is a schematic elevational view of the press.
FIG. 2 is a section through the filling chamber of the press illustrated in FIG. 1.

A press stand, constructed as a frame 1, is rigidly connected to a front carrier 10, which, via a magnetic holding plate 22, supports the fixed plunger 7. A rear carrier 1*a*, mounted on the frame 1 and not shown in detail in the drawing, supports the pressure cylinder 2 with piston 3, which via a mounting plate 9 and the magnetic holding plate 22 supports the movable plunger 6. The second piston 8 is connected with a mounting plate 9 via piston rods 25 slidably disposed in the hydraulic pressure cylinder 24. The first piston 4 is also slidably mounted in the hydraulic pressure cylinder 24 and functions as a flying piston therein and is connected with a stop 5 via the adjusting bar 26. On the advance of the piston 4 and likewise thus of piston 8, for the feed movement, the stop 5 can come to rest against the end surface 27 of the pressure cylinder 24. At three points in the pressure cylinder 24 apertures are provided for the supply and discharge of the pressure medium by conventional means (not illustrated). The pressure cylinder 2 is provided at the rear with a liquid container 17 which is connected via a valve device with a liquid chamber 19 behind the piston 3 in the pressure cylinder 2. The feed conduit 29 serves to apply pressure to the piston 3.

The stripper platen 12 is provided with a filling space 13 and pressure ring 23; the actual female mold forms around the fixed plunger 7, on which the stripper platen 12 and ring 23 are slidable. The forward and return movement of the stripper platen are effected via guide bars 16 which are connected to the piston rod 11 of the piston 28 in the cylinder 20 via a connecting piece 21. The feed movement of the stripper platen 12 can be limited by means of stops 30 which come to rest on the outside and on the inside against the perpendicular outer wall of the frame 1. In place of the outer stop 30 a stop 30' may also be provided in the interior of the frame 1 on the bar 16 in which case the feed movement is limited by the stop 30' coming to rest against the front carrier 10. The molding batch is fed in through the filling hopper 14, which, in the initial position shown in the drawing, is situated immediately above a feed conduit 14' leading into the filling space 13. The stripper platen 12 with its stripping plate 31 is slidably guided underneath the stripping frame 15 mounted on the filling hopper 14. The filling hopper 14 and the feed conduit 14' may extend over the entire width of the press, i.e. over a number of filling chambers, so that a number of adjacent molds can be fed therefrom. The mounting plate 9 is shown angularly shifted through an angle of 90 degrees for sake of clarity, so that it can be seen, from the broken lines, that the assembly can be provided with two further magnetic holding plates 32 for additional plungers, (not illustrated), which are disposed horizontally next to the magnetic holding plate 22.

MANNER OF OPERATION

The press described above operates, for example, as follows:

From the ejection position shown the plunger 6 having the operating punch is first of all moved forward, via conventional hydraulic pressure means (not illustrated) by applying pressure to the piston 4, which moves forward as far as the position limited by the stop 5, toward the plunger 7 supporting the stationary punch, i.e. until it is at a distance approximately corresponding to twice the thickness of the molding to be produced, since the ratio of the compression effected in the pressing process is approximately 2:1. The stripper platen 12 is then moved by the piston 28 and the bars 16, until the filling space is situated above the intermediate space between the punches of the two plungers 6 and 7, so that the molding batch can flow into the mold. The stripper platen 12 is then drawn backwards until the presssure ring 23 closes the intermediate space between the punches of the two plungers 6 and 7, i.e. the mold therein is closed. The pressing process then takes place by the application of pressure with intermediate ventilation if necessary, to the piston 3, via the conduit 29. A valve device 18 effects in the preceding feed movement of the piston 3, by the piston 4, for pressure fluid in the container 17 to flow out through it into the liquid chamber 19, so that only a small quantity of pressure fluid inflow via the conduit 29 is required for the pressing process. Simultaneously with the application of pressure to the piston 3 pressure can be applied via non-illustrated hydraulic conduit means through the middle feed aperture in the pressure cylinder 24 to the piston 8 in order to intensity the pressure obtained against the mounting plate 9. After the pressing process the stripper platen 12 is moved back into the position illustrated by applying pressure to the double-acting piston 28 from the other side. At the same time the plunger 6, by the application of pressure to the piston 8, is likewise moved back from the other side. In this process the piston 4 also slides into its initial position, as the space between the two pistons 4 and 8 is closed, in the same manner as the piston 4, subjected to fluid pressure, had pushed the piston 8 in the course of the preceding feed movement and thus effected the positioning operation. In the return movement of the piston 3 the valve device 18 allows liquid to flow back out of the liquid chamber 19 into the liquid container 17.

In the sectional drawing of the filling space 13 in FIG. 2 the cross-hatching illustrates how the filling space 13 is closed underneath the mold, so that the mold batch can only flow into the mold but cannot trickle farther downwards.

A positioning operation in accordance with claim 1, without recourse to the stop 5, can be effected by non-illustrated conventional pressure adjusting means provided in the feed conduits to the pressure cylinder 24.

All the movements of the press are automatically controlled by conventional known means.

Although the invention is illustrated and described with reference to a plurality of preferred embodiments thereof, it is to be expressly understood that it is in no way limited to the disclosure of such preferred embodiments, but is capable of numerous modifications within the scope of the appended claims.

We claim:

1. In an improved press for molding ceramic material having a base frame on which a first front carrier is mounted for fixedly supporting a first stationary punch, and a second rear carrier is mounted for reciprocally movably supporting a second punch coaxially with respect to said first punch, and first and second horizontally slidably movable support frames respectively reciprocally movably mounted via piston-cylinder means on said first and second carriers, and male-female mold means respectively operatively mounted on said first and second punches for pressing a ceramic molding therebetween, the improvement comprising (a) said second support frame on which one half of said male-female mold means is mounted is operatively fixedly connected to a first pair of piston rods having a first pair of pistons, said first pair of pistons being mounted in a pair of cylinders which are fixedly mounted in said second carrier, said pair of cylinders being operatively connected to a source of hydraulic pressure so as to form with said first pair of pistons first double-acting piston-cylinders, and second pistons and piston rods operatively mounted in said pair of cylinders so as to function as flying pistons therein, each of said pair of cylinders having a rear end wall remote from said second carrier which is provided with a bore, said second piston rods extending through said bores and being slidably disposed therein, and limit stop means respectively adjustably operatively mounted on the free ends of said second piston rods to limit the advance of the corresponding half of said male-female mold means;

(b) a second piston-cylinder means is operatively connected to said second support frame and only exerts pressure on the corresponding half of said male-female mold during the molding process, thereby compressing the ceramic molding at a ratio of about 2:1;

(c) stripper means operatively mounted on said first support frame, a pair of rods being slidably mounted in said first front carrier and fixedly secured to said first support frame, a third double-acting piston-cylinder being operatively mounted in said base frame and said pair of rods being connected to said stripper means being slidably in said first front carrier, said third double-acting piston-cylinder also being operatively connected to a source of hydraulic pressure; and (d) including first and second permanent magnet means respectively operatively connected to said stationary and movable punch, said stationary and movable punch being respectively supported on said first front carrier and said horizontally slidably movable support frame via said first and second permanent magnet means, whereby the space between said first and second punches is laterally substantially freely accessible when said press is in an inoperative position.

2. The improved press for molding ceramic material as set forth in claim 1, wherein said first pair of pistons which form with said pair of double-acting piston cylinders are adapted to exert additional molding pressure on the outer zone of said second punch.

3. The improved press for molding ceramic material as set forth in claim 2, wherein said stripper means includes a platen defining an annular chamber around said stationary punch permitting a lateral flow about said stationary punch of material to be pressed.

4. The improved press for molding ceramic material as set forth in claim 3, wherein said annular chamber has an inlet in its upper region and is closed in its lower region.

5. The improved press for molding ceramic material as set forth in claim 4, including a hopper mounted on said base frame immediately above said stripper means and adapted to receive ceramic material and conduct it to said annular chamber.

6. The improved press for molding ceramic material as set forth in claim 5, wherein the stripper means include stop means adapted to coact with said first horizontally slidably movable support frame to limit the movement of said stripper means and third double-acting piston-cylinder.

* * * * *